(No Model.)

J. WADSWORTH.
SWIVEL LOOM.

No. 466,866.  Patented Jan. 12, 1892.

WITNESSES:
Richard A. Henly
Geo. M. Baker

INVENTOR:
Joseph Wadsworth (No Model.) 6 Sheets—Sheet 2.

J. WADSWORTH.
SWIVEL LOOM.

No. 466,866. Patented Jan. 12, 1892.

WITNESSES:
Richard A. Healy
Geo. M. Baker

INVENTOR:
Joseph Wadsworth (No Model.) 6 Sheets—Sheet 3.

J. WADSWORTH.
SWIVEL LOOM.

No. 466,866. Patented Jan. 12, 1892.

WITNESSES:
Richard A. Healy
Geo. M. Baker

INVENTOR:
Joseph Wadsworth

(No Model.)

J. WADSWORTH.
SWIVEL LOOM.

No. 466,866. Patented Jan. 12, 1892.

WITNESSES:
Richard A. Healy
Geo. M. Baker

INVENTOR:
Joseph Wadsworth

(No Model.)

J. WADSWORTH.
SWIVEL LOOM.

Patented Jan. 12, 1892.

WITNESSES:
Richard A. Henly
Geo. M. Baker

INVENTOR:
Joseph Wadsworth (No Model.) 6 Sheets—Sheet 6.

J. WADSWORTH.
SWIVEL LOOM.

No. 466,866. Patented Jan. 12, 1892.

WITNESSES:

INVENTOR:
Joseph Wadsworth

United States Patent Office.

JOSEPH WADSWORTH, OF PATERSON, NEW JERSEY.

SWIVEL-LOOM.

SPECIFICATION forming part of Letters Patent No. 466,866, dated January 12, 1892.

Application filed August 26, 1890. Serial No. 363,159. (No model.)

*To all whom it may concern:*

Be it known that I, JOSEPH WADSWORTH, of the city of Paterson, in the county of Passaic and State of New Jersey, have invented certain new and useful Improvements in Swivel-Looms, of which the following is a specification.

My invention relates to that class of looms in which "swivel-shuttles" are used.

My improvements are more particularly adapted for use on what is commonly known as a "box-loom," the object being to convert such a loom into a "power swivel-loom" without interfering with its working as a box-loom. I accomplish this by the devices shown in the accompanying drawings, in which similar letters refer to like parts.

Figure 3:
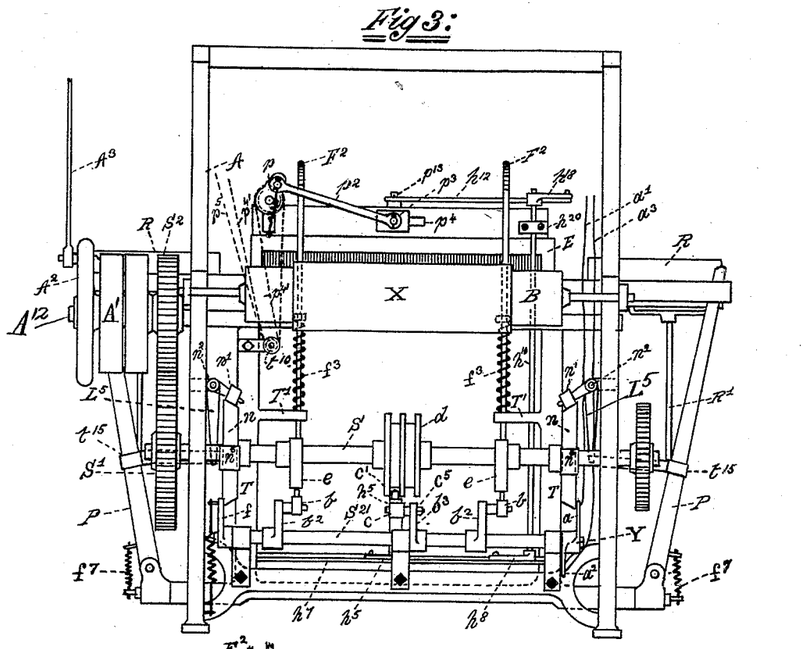
Fig. 3 is a back elevation of the same.

A designates the frame of the loom; S, the cam-shaft; $S^{21}$, the treadle-shaft supported in brackets, as shown in Fig. 3; S′ and $S^2$, gear-wheels by which the cam-shaft is turned from the crank-shaft $A^{12}$; B, the warp-roller; C, the breast-roller; D, the cloth-roller; X, the cloth; E, the reed; F′, the lay; R, the shuttle-boxes of the fly-shuttles; P, the picking-sticks for the fly-shuttles; $m^2$, the swivel-shuttle rack-bar; G, the swivel-shuttles; $F^2$, the gooseneck rods, which support the swivel-rack; $n$ $n$, the cams which operate the picking-sticks for the fly-shuttles through the connections $L^5 \, t^{15}$; $e \, e$, the cams which operate the treadles $b \, b$ to sink the swivel-rack; $d$, the switching-cylinder which operates the lever $h^5$ to throw the swivel-shuttles longitudinally.

Figures 11, 12:
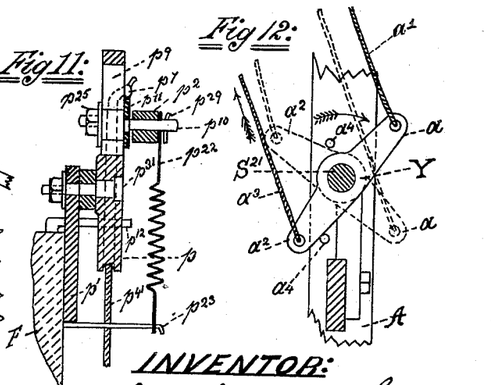
Fig. 11 is a view of the same in section.
Fig. 12 is a view of the double-armed lever secured to the shaft $S^{21}$ and adapted to partially rotate the latter.

Y, Fig. 12, is the lever by means of which the treadle-shaft $S^{21}$ is rotated to lift the treadles $b \, b$ and the lever $h^5$ into position to be operated upon by the cams $e \, e$ and switching-cylinder $d$, respectively, and also to drop the same out of engagement with said cams and switching-cylinder.

$p$ is the disk for changing the position of the swivel-shuttles.

As different terms are often used to designate the same part of a loom I shall, in order to avoid confusion, in speaking of the "swivel-rack" refer to the swivel-batten and rack-bar and whatever may be necessary to hold the swivel-shuttles.

The harness and other portions of the loom not necessary to a full understanding of my improvements are omitted from the drawings.

In Letters Patent No. 338,891, dated March 30, 1886, I have described a swivel-shuttle loom in which only one fly-shuttle is used; but my present improvements are especially adapted to be used in what is commonly known as a "box-loom," in which two or more fly-shuttles are used. Such a loom provided with my improvements herein described will be capable of the following three motions, to wit: first, plain weaving; second, combined plain and swivel weaving; third, shifting of the swivel-shuttles in order to change the position of the figures woven in the fabric. All these motions are to be operated by power and controlled by the Jacquard or other pattern mechanism. I shall describe these motions and the devices employed for producing the same in the order above named.

Figure 1:
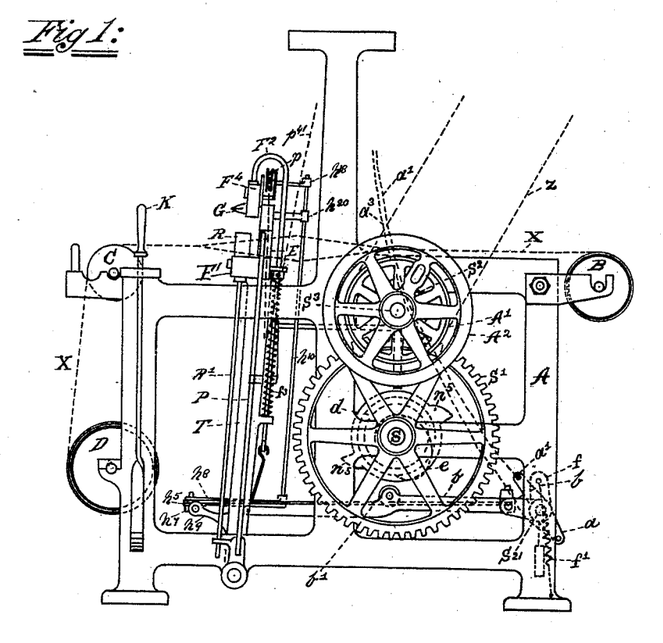
Figure 1 is a side elevation of a loom containing my improvements.
Figure 2:
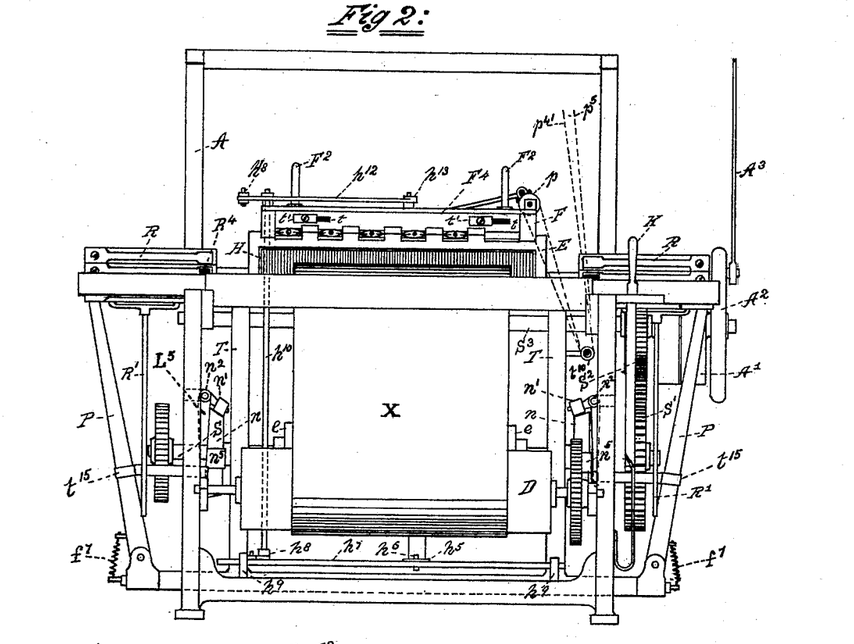
Fig. 2 is a front elevation of the same.
Figure 8:
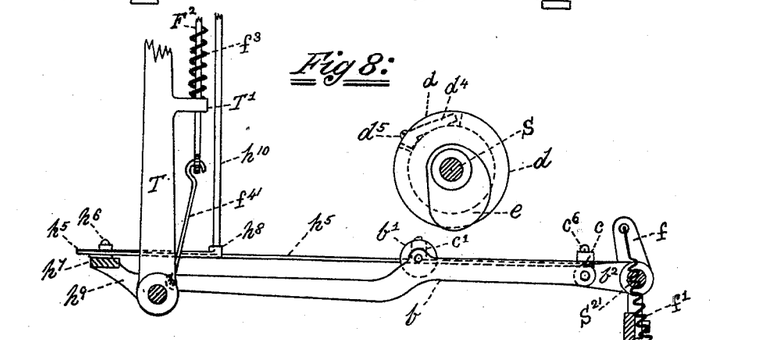
Fig. 8 is the same out of action.

First, the plain-weaving motion: The loom is adjusted for plain weaving, as shown in Fig. 1. The construction and operation of the several parts of the loom for this motion are exactly the same as they are in any ordinary box-loom. The cams $n$ on the cam-shaft S (see Figs. 3 and 4) are each provided with two wipers $n^5$, which, as the shaft S rotates, strike against the roller $n'$ on one arm of the bell-crank lever $L^5$, which latter is pivoted to the frame of the loom at $n^2$. To the other arm of the lever $L^5$ is fastened one end of the strap $t^{15}$, the other end of said strap being secured to the picking-stick P. As often as the wiper $n^5$ strikes the roller $n'$ the lever $L^5$ will be operated and the picking-stick P will make an inward movement. After the wiper $n^5$ has passed the roller $n'$ the spring $f^7$ causes the picking-stick P to resume its former position. The wipers $n^5$ are so placed that the picking-sticks P will act simultaneously and each make two picks during each revolution of the cam-shaft. When the loom is adjusted for plain weaving, the parts which operate the swivel-shuttles are out of action, as shown in Fig. 8.

Figure 4:
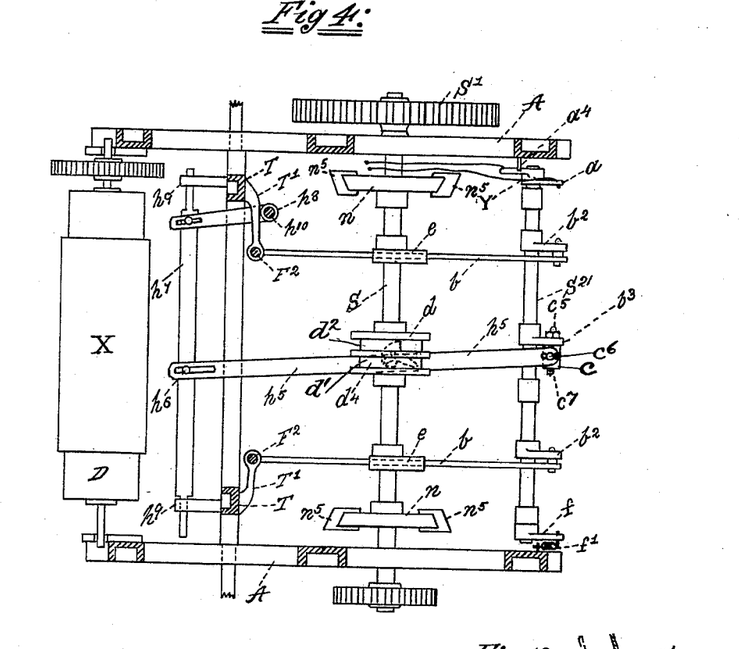
Fig. 4 is a sectional plan of the same.
Figure 5:
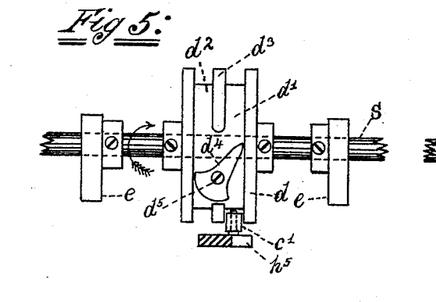
Figs. 5 and 6 are views of the switching-cylinder of the swivel-motion.
Figure 6:
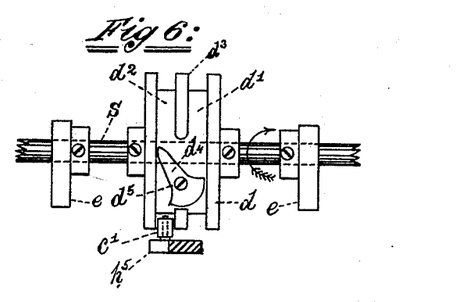
Figure 7:
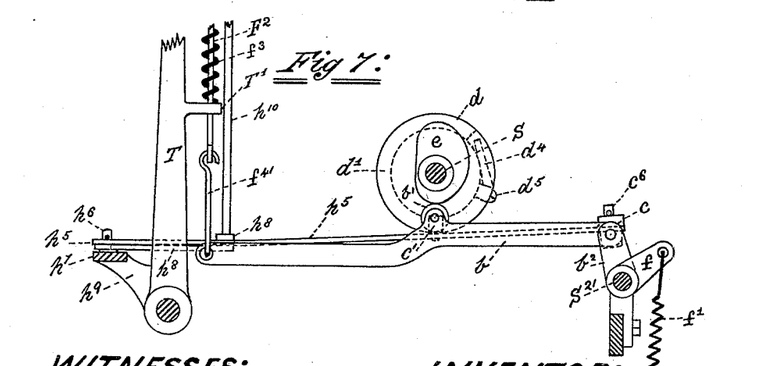
Fig. 7 is a side view of the devices for operating the swivel-shuttle adjusted for action.
Figure 13:
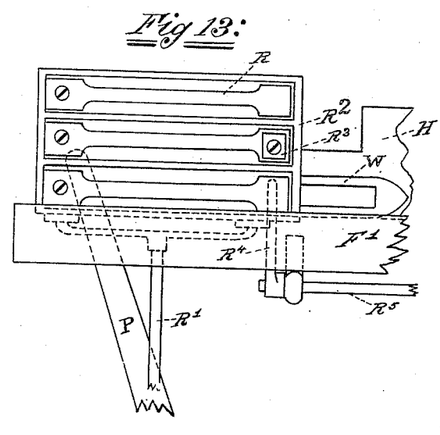
Fig. 13 is a view of the fly-shuttle boxes and adjacent parts at one end of the lay.
Figure 15:
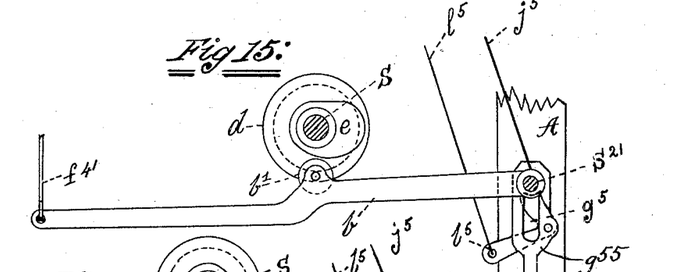
Figs. 15, 16, and 17 are views of a modification of my improvement, showing the treadle-shaft $S^{21}$, adapted to move vertically instead of being rotated.
Figures 16, 17, 18:
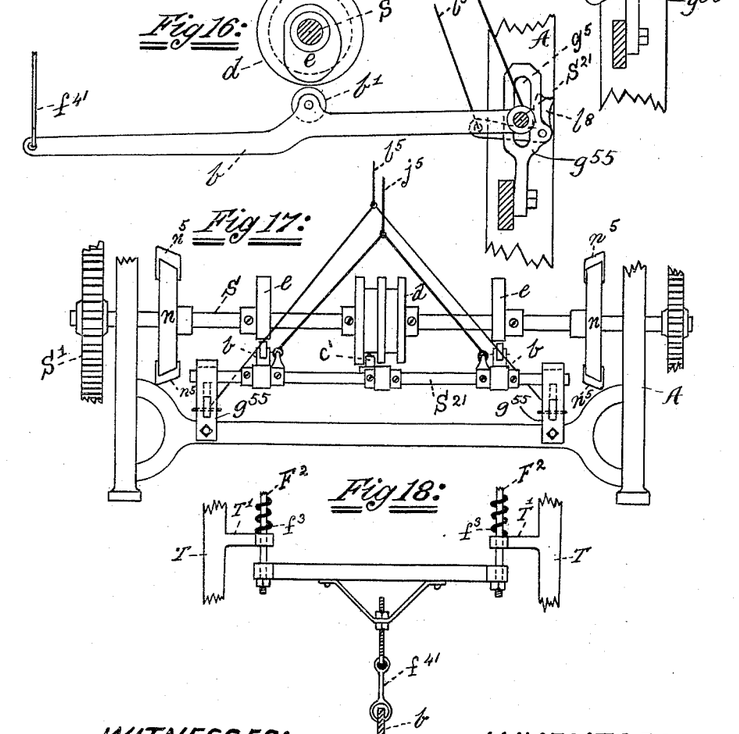
Fig. 18 is a view of a modification of my improvement, showing the two rods $F^2$ connected by a bar, so that the swivel-rack may be pulled downward by means of one treadle and one cam instead of by two treadles and two cams.

Second, the combined plain and swivel motion: The plain weaving has just been described. While the plain weaving is being carried on the treadles $b$ and lever $h^5$ are out of reach of their operating-cams $e$ and $d$, but directly under the latter, as shown in Fig. 8. The introduction of the swivel-shuttles is effected by lifting the ends of the treadles $b\ b$ and the lever $h^5$, which are connected to the treadle-shaft $S^{21}$, until said treadles and lever are brought into a position to be acted upon by their respective cams. This may be accomplished in various ways. For instance, the shaft or bar $S^{21}$ may be so adjusted that it shall be capable of a vertical motion, having its ends moving in slots in the framing of the loom. By the intervention of the Jacquard or other pattern mechanism the shaft or bar $S^{21}$ may then be caused to move vertically, carrying with it the ends of the treadles $b\ b$ and lever $h^5$, which are pivoted thereto, to a height necessary to place said treadles and lever in engagement with their respective cams. Such a construction is shown in Figs. 15, 16, and 17. The ends of the treadle-shaft $S^{21}$ are adapted to move vertically in the slots $g^5$ in the brackets $g^{55}$. By means of the wire $j^5$ the pattern mechanism pulls upward the shaft $S^{21}$ until the pivoted supports $l^8$ drop under the shaft to sustain the latter in its elevated position. (See Fig. 15.) When it is desired to throw the swivel parts out of action, the pattern mechanism pulls up the wire $l^5$, thereby disengaging the pivoted support $l^8$ from the shaft $S^{21}$ and allowing the latter to drop into its former position, as shown in Fig. 16. Another and preferable way of arriving at the same result is that shown in the other figures—namely, by pivoting the ends of the treadles $b\ b$ and lever $h^5$ to arms secured to the shaft $S^{21}$ and then rotating said shaft by means of the lever Y. When the loom is doing plain weaving, this lever Y is in the position shown by the solid lines in Fig. 12. The treadles $b\ b$ and the lever $h^5$ are below their operating-cams and out of reach of the latter. The Jacquard mechanism causes to be pulled up the wire $a^3$, which is attached to the arm $a^2$ of the lever Y, thereby making the latter assume the position shown by the broken lines in Fig. 12. As the lever Y is rigidly secured to the shaft $S^{21}$, when the former is operated the latter is rotated. The extent of this rotation is regulated by the stops $a^4$, which are so placed that the shaft shall make about a quarter-revolution in either direction. To the shaft $S^{21}$ are rigidly fastened the lever arms $b^2$ and $b^3$, and to these latter are pivoted the treadles $b$ and the lever $h^5$, respectively, as shown in Fig. 4. When, therefore, the shaft $S^{21}$ is rotated backward, as above described, the treadles $b$ are lifted up into a position to be operated upon by the cams $e$, and the lever $h^5$ is similarly brought into engagement with the switching-cylinder $d$ for the purpose of bringing into action the swivel-shuttles. As the cam-shaft S revolves, the cams $e$ strike the rollers $b'$ on the treadles $b$, depressing the latter and pulling downward by means of the connecting-links $f^{41}$ the goose-neck rods $F^2$, to which is attached the swivel-rack containing the swivel-shuttles G, thereby bringing the latter into working position. Almost simultaneously with this downward movement the swivel-shuttles are driven longitudinally by means of the switching-cylinder $d$, acting in connection with the levers $h^5\ h^8\ h^{18}$, shaft $h^{10}$, rods $h^7\ h^{12}$, and the rack $m^{29}$ and pinions $m'$. By referring to Figs. 5 and 6 the construction and operation of the switching device will readily be understood. It consists of a cylinder $d$, provided with two parallel grooves $d'\ d^2$, which extend entirely around the cylinder in planes at right angles to the axis of the cylinder. A portion of the rib $d^3$, which separates the two grooves, is cut away and in its place is pivoted the T-shaped tongue $d^4$, as shown in Figs. 5 and 6. The tongue $d^4$ turns freely upon its pivot $d^5$ and is of such length that when parallel with the grooves $d'$ $d^2$ it will about occupy the space made by the cutting away of the rib $d^3$, and when in the position shown in Figs. 5 and 6 will extend from the outside wall of groove $d'$ to the outside wall of groove $d^2$, forming an oblique slideway between the two grooves. Referring now to Fig. 5, the roller $c'$ of the lever $h^5$ is in the groove $d'$ while the cylinder $d$ is moving in the direction of the arrow. The lever $h^5$ is pivoted to the arm $b^3$ of shaft $S^{21}$ in a manner to permit of its movement in two planes, vertical and horizontal. This may be done in any convenient manner. The device used by me for accomplishing this is shown in Fig. 4, and consists of a thimble or ferrule $c$, fitted loosely over a bolt $c^5$, which latter is rigidly fastened to the arm $b^3$, the ferrule being prevented from slipping off the bolt $c^5$ by a pin $c^7$ or in any other suitable manner. The ferrule $c$ is provided with a stud $c^6$, which passes through a hole in the end of the lever $h^5$, permitting the latter to turn around the same. When the shaft $S^{21}$ is rotated, the arm $b^3$ carries upward or downward in an approximately vertical plane the end of the lever $h^5$, which is pivoted to the ferrule $c$, the stud $c^6$ on the latter always retaining its upright position as the ferrule $c$ slips or turns on the bolt $c^5$, and when by the operation of the switching-cylinder $d$ the lever $h^5$ is given a lateral motion said lever is permitted to move in the horizontal plane by turning upon its pivotal stud $c^6$. The roller $c'$ continues in the groove $d'$ until it strikes the tongue $d^4$, when it is immediately shunted along the edge of the latter into groove $d^2$. This, as will be seen, carries the lever $h^5$ from right to left, and it, acting through the parts described, causes the swivel-shuttles to make a shot from left to right. As the roller $c'$ passes into the groove $d^2$ it strikes against the head of the tongue $d^4$, and as the cylinder $d$ continues to revolve the roller $c'$ presses against the head of $d^4$, causing the latter to turn upon its pivot $d^5$ and throwing it into the position shown in Fig. 6, the roller $c'$ at the same time slipping past and continuing in the groove $d^2$. As soon as the roller $c'$ has passed from groove $d'$ into groove $d^2$ the cams $e$ release the treadles $b$, and the springs $f^3$ at once lift the swivel-rack out of the raceway of the lay, leaving it clear for the passage of the fly-shuttle. While the roller $c'$ is in the groove $d^2$ and before it again meets the tongue $d^4$ the cams $n$ operate the picker-sticks for the fly-shuttle, and a shot of that shuttle is made before another passage of the swivel-shuttles. Immediately after the shot of the fly-shuttle has been made the continued rotation of the cam-shaft causes the cams $e$ to operate the treadles $b$, as before, and almost at the same time the roller $c'$ in the groove $d^2$ again meets the tongue $d^4$, and the former is, in the manner above described, shunted back again to groove $d'$, causing the lever $h^5$ to move from left to right and the swivel-shuttles to make a shot from right to left, after which the swivel-rack is again withdrawn from the raceway of the lay and a shot of the fly-shuttle is made as before. The roller $c'$ makes the passage from one groove to the other once during each revolution of the cylinder $d$, thus causing one shot of the swivel-shuttles for every revolution of the cam-shaft, this shot of the swivel-shuttles alternating with one shot of the fly-shuttle during the same revolution, as above described. This may be continued as long as desired. Instead of there being two treadles $b\ b$ and two operating-cams $e\ e$, the rods $F^2$ may be united at their lower ends by a horizontal bar and the latter pulled downward by means of one link and one treadle, in which case only one cam would be required, (see Fig. 18;) or there may be two or more treadles and their operating-cams to give the downward motion to said bar. I consider it preferable, however, to use two treadles and two cams without the connecting-bar, as above described. It is evident that the cams $e$ and switching-cylinder $d$, which operate the swivel-shuttles, and the cams $n$, which operate the fly-shuttles, must be so arranged on the shaft S with reference to each other that the two sets of cams shall act alternately. The gear-wheels $S'$ and $S^2$ must be proportioned in the ratio of two to one, the diameter of $S^2$ being one-half that of $S'$. In a box-loom, however, it is usual, as above stated, for both picking-sticks for the fly-shuttles to act simultaneously, each stick making two picks during each revolution of the cam-shaft, collision between any two shuttles being prevented by reason of the fact that one picking-stick always moves in the empty box which is to receive the shuttle from the opposite side of the loom. My improvements do not in any manner interfere with the operations of a box-loom, as such and the picking-sticks for the fly-shuttle continue to act as they would act were my improvements not incorporated in the loom; but when the loom is adjusted for combined plain and swivel weaving and the swivel-shuttles are brought into action it becomes necessary to eliminate one of the shots of the fly-shuttle for every revolution of the cam-shaft in order to allow a shot of the swivel-shuttles to be made in its stead. This is done by having an empty fly-shuttle box at each side of the loom and on a level with the raceway of the lay at the time of every alternate inward movement of the picking-sticks P during the time the loom is adjusted for combined plain and swivel weaving, so that said picking-sticks shall move in empty boxes without operating a fly-shuttle while the swivel-shuttles are in action. It is evident, therefore, that in a box-loom provided with my improvements there must be at least two empty fly-shuttle boxes. There may be more than two empty shuttle-boxes; but only two are necessary. Thus, for example, if the loom have four boxes on each side and only three fly-shuttles are being used the fact that then there will be more than two empty boxes will not in the least affect the operation of the loom, it being only necessary to have one of the empty boxes at each side of the loom and on a level with the raceway of the lay at the time above stated. Again, connected with the usual box-loom is what is known as the "stop-motion," a portion of such a motion being shown in Fig. 13 at $R^4\ R^5$. This motion ordinarily becomes operative when both the opposing boxes on a line with the raceway of the lay are empty and stops the action of the loom; but, as has been seen, when the swivel-shuttles are in action in my improved loom it is essential that these two boxes shall be empty. Some provision must, therefore, be made to prevent the stoppage of the loom when the swivel-shuttles are brought into action. This may be accomplished by securing a piece, like $R^3$, to the outside of the spring R of the box $R^2$ or otherwise increasing the thickness of the spring or in any other manner causing it to project as far beyond the box when the latter is empty as it would did the box contain a shuttle. It will thus be seen that when such an empty box is in a line with the raceway the finger R⁴ will be kept pressed outward to prevent the action of the stop motion in the same manner as it would did the box contain a shuttle. As the stop-motion is usually made double, to be operated at both sides of the loom, it will be necessary to construct only one box, as above described. This completes the description of the several parts necessary for and the operation of the combined plain and swivel movement. If it be desired to return to plain weaving, the Jacquard or other pattern mechanism (not shown) lifts the wire $a'$, attached to the arm $a$ of the lever Y, thereby rotating the shaft $S^{21}$ a quarter-revolution in the direction opposite to that shown by the arrow in Fig. 12 and disengaging the treadles $b$ and lever $h^5$ from their operating-cams, allowing them to fall into the positions shown in Fig. 8. The swivel movement is thus eliminated, the swivel-shuttles are by the action of the springs $f^3$ removed from the raceway of the lay, and the loom continues its plain weaving as an ordinary box-loom. In order that the shaft $S^{21}$ shall not be rotated too far in either direction, the stops $a^4$ are placed upon the framing, as shown in Fig. 12, and the spring $f'$ holds the shaft in position after it has been thus rotated.

Figure 9:
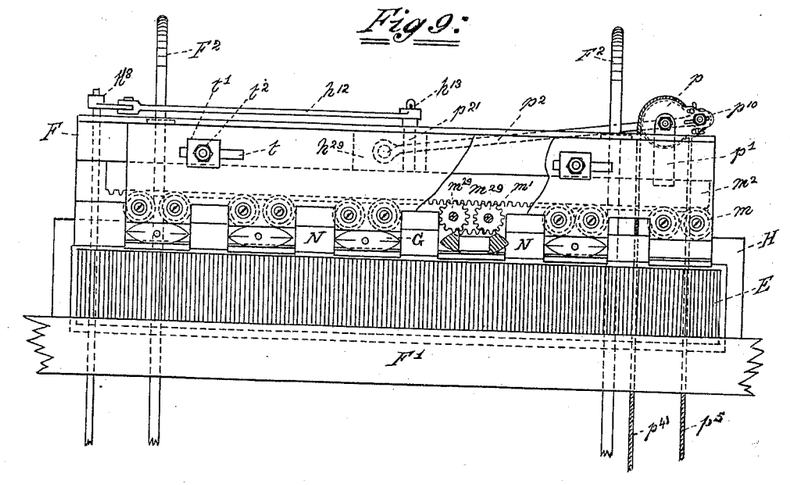
Fig. 9 is a front view of the swivel-rack and shuttles with their connections, showing also the reed and part of the lay-beam.
Figure 10:
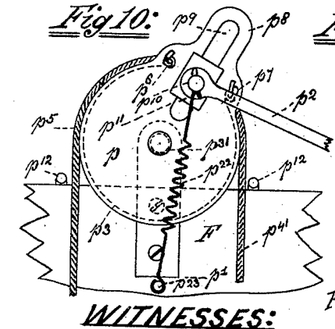
Fig. 10 is a view in detail of the device for changing the position of the swivel-shuttles.
Figure 14:
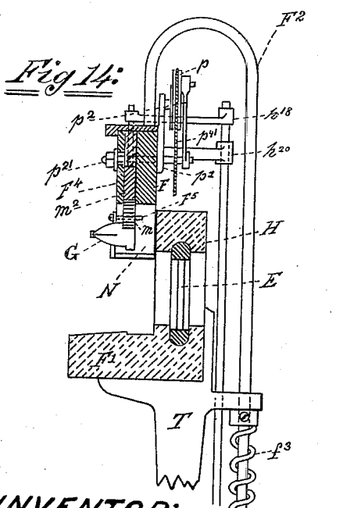
Fig. 14 is a view in section of the parts shown in Fig. 9.

Third, the shifting of the swivel-shuttles: This is effected by means of the device shown in Figs. 10 and 11. It consists of a disk $p$, pivoted on a bracket $p'$, which latter is secured to the bar or plate F, which connects the goose-neck rods $F^2$, as shown in the drawings. This disk is provided with a projecting arm $p^8$, and on its circumference and extending almost entirely around it is the groove $p^3$ to receive the cords $p^5$ and $p^{41}$, by means of which the disk is rotated. The ends of the cords $p^5$ and $p^{41}$ pass through holes in the disk and are secured to the latter by the knots $p^6$ $p^7$. The stops $p^{12}$ regulate the extent of the rotation of the disk in either direction. The arm $p^8$ of the disk is provided with the slot $p^9$, through which passes the stud $p^{10}$. One end of this stud is threaded and provided with a nut $p^{25}$ on one side of the disk $p$, while on the other side of the disk the stud at about its center is enlarged into or provided with the flange $p^{11}$, as shown in Fig. 11. By screwing up the nut $p^{25}$ the stud $p^{10}$ may be firmly secured in any part of the slot $p^9$. The stud $p^{10}$ extends beyond the flange $p^{11}$ to form a pivot upon which turns one end of the rod $p^2$, the other end of said rod being pivoted to the swivel-batten, as shown in Fig. 9. To the stud $p^{10}$ is attached one end of the spring $p^{22}$, the other end being secured to the post $p^{23}$ on the plate or bar F. The action of this spring is downward and tends to hold the disk $p$ in a given position, as hereinafter described. The cords $p^5$ and $p^{41}$ pass downward and around the pulleys $t^{10}$ and then upward to the Jacquard or other pattern mechanism by which the cords are operated. As the cords are pulled, first one and then the other, the disk $p$ is rotated first in one direction and then in the opposite, thrusting the rod $p^2$ forward and pulling it backward, and thereby changing the position of the swivel-shuttles as the swivel-rack is made to slide back and forth on the bolts $t^2$ in the slots $t$, said bolts $t^2$ being secured to the plate connecting the goose-neck rods $F^2$. When the swivel-shuttles have been given a desired position by the forward or backward movement of the rod $p^2$, as above described, the spring $p^{22}$ prevents any change in that position by holding the disk $p$ firmly in place against the stop $p^{12}$ until it is desired to change the position of the swivel-shuttles, which is accomplished by rotating the disk $p$ in the opposite direction by means of the cord $p^5$ or $p^{41}$, as above described. It is obvious that the strength of the spring $p^{22}$ must not be so great as to interfere with the rotation of the disk $p$. The length of the throw of the rod $p^2$ is made shorter or longer by moving the stud $p^{10}$ nearer to or farther away from the center of the disk $p$. By this means, through the intervention of a pattern mechanism, the position of the figures in the fabric may be regulated. After the position of the swivel-shuttles has been shifted, as above described, in order that the action of the shuttles themselves be not deranged, the shaft $h^{10}$ must occupy the same position with reference to the shuttles which it had before the swivel-shuttles were shifted. This is effected by causing the shaft to move backward and forward with the swivel-rack. I accomplish this by having the upper end of the shaft pass through a plate $h^{20}$, secured to the swivel-batten, as shown in Figs. 3 and 14.

This completes the description of my improvements. I have described certain forms of devices; but it is obvious that substitutes may be employed for the same purposes, and parts which I have shown as single may be duplicated, and vice versa, or the rotating shaft $S^{21}$ may be replaced by a vertically-moving bar or shaft, as above described, and shown in Figs. 15 and 16, without in any way affecting the principle of my invention.

What I claim as my invention, and desire to secure by Letters Patent, is—

1. The combination, with the swivel-rack, of a cam-shaft provided with one or more cams, one or more treadles to be acted upon by said cam or cams to sink the swivel-rack, as described, intermediate mechanism connecting said treadle or treadles with the swivel-rack, pivotal connections for said treadle or treadles, and means for changing the vertical position of said pivotal connections, whereby the treadle or treadles may be raised or lowered for the purpose of placing it or them in and out of engagement with its or their said operating cam or cams, substantially as described.

2. The combination, with the swivel-rack, of a cam-shaft provided with two cams, two treadles to be acted upon by said cams to sink the swivel-rack, intermediate mechanism connecting said treadles with the swivel-rack, a treadle-shaft having pivotal supports for said treadles and capable of having imparted to it a rotary motion, and means for rotating said treadle-shaft, whereby the treadles may be raised or lowered for the purpose of placing them in and out of engagement with their said operating-cams, substantially as described.

3. The combination, with the swivel-rack, of a cam-shaft provided with two cams, two treadles to be acted upon by said cams to sink the swivel-rack, intermediate mechanism connecting said treadles with the swivel-rack, a treadle-shaft having pivotal supports for said treadles, which shaft is capable of a rotary motion, and a reciprocating device adapted to be controlled by a pattern mechanism and adapted to give a rotary motion to said treadle-shaft, whereby the treadles may be raised or lowered for the purpose of placing them in and out of engagement with their operating-cams, substantially as described.

4. The combination, with the swivel-rack, of the cam-shaft S, provided with the cams $e$, the treadles $b$, links $f^{41}$, rods $F^2$, and springs $f^3$, the treadle-shaft $S^{21}$, provided with lever-arms $b^2$, the double-armed lever Y, adapted to be controlled by a pattern mechanism and adapted to give a rotary motion to said treadle-shaft, and the stops $a^4$, arranged substantially as described.

5. The combination of a cam-shaft provided with a switching device, a lever to be actuated by said switching device and by it given a reciprocating lateral motion, the swivel-shuttles, intermediate mechanism connecting said lever with the swivel-shuttles for operating the latter, pivotal connections for said lever, and means for changing the vertical position of said pivotal connections, whereby the lever may be raised or lowered for the purpose of placing it in and out of engagement with said switching device, substantially as described.

6. The combination of a cam-shaft provided with a switching device, substantially such as described, with a lever to be actuated by said switching device and by it given a reciprocating lateral motion, the swivel-shuttles, intermediate mechanism connecting said lever with the swivel-shuttles for operating the latter, and a treadle-shaft having a pivotal support for said lever and capable of having imparted to it a rotary motion, whereby the lever may be raised or lowered for the purpose of placing it in and out of engagement with the said switching device, substantially as described.

7. The combination of a cam-shaft provided with a switching device, substantially such as described, with a lever to be actuated by said switching device and by it given a reciprocating lateral motion, the swivel-shuttles, intermediate mechanism connecting said lever with the swivel-shuttles for operating the latter, a treadle-shaft having a pivotal support for said lever, which shaft is capable of a rotary motion, and a reciprocating device adapted to be controlled by a pattern mechanism and adapted to give a rotary motion to said treadle-shaft, whereby the lever may be raised or lowered for the purpose of placing it in and out of engagement with said switching device, substantially as described.

8. The combination, with the swivel-shuttles, of the cam-shaft S and means for rotating the same, the switching-cylinder $d$, lever $h^5$, connecting-bar $h^7$, shaft $h^{10}$, rod $h^{12}$, and levers $h^8$ $h^{18}$, rack $m^2$, pinions $m'$, treadle-shaft $S^{21}$, provided with lever-arm $b^3$, the double-armed lever Y, adapted to be controlled by a pattern mechanism and to give a rotary motion to said treadle-shaft, and the stops $a^4$, arranged substantially as described.

9. The combination, with the swivel-rack and the swivel-shuttles, of a cam-shaft provided with one or more cams and a switching device, treadles to be acted upon by said cam or cams to sink the swivel-rack, as described, intermediate mechanism connecting said treadles with the swivel-rack, a lever to be actuated by said switching device and by it given a reciprocating lateral motion to operate the swivel-shuttles, intermediate mechanism connecting said lever with the swivel-shuttles, pivotal connections for said treadle or treadles and lever, and means for changing the vertical position of said pivotal connections, whereby the treadle or treadles and lever may be raised or lowered for the purpose of placing them in and out of engagement with said cam or cams and switching device, respectively, substantially as described.

10. The combination, with the swivel-rack and the swivel-shuttles, of a cam-shaft provided with two cams and a switching device, substantially such as described, two treadles to be acted upon by said cams to sink the swivel-rack, a lever to be actuated by said switching device and by it given a reciprocating lateral motion to operate the swivel-shuttles, intermediate mechanism connecting said treadles with the swivel-rack and said lever with the swivel-shuttles, and a treadle shaft or bar having pivotal supports for said treadles and lever and capable of having imparted to it a rotary motion, whereby the said treadles and lever may be raised or lowered for the purpose of placing them in and out of engagement with said cams and switching device, respectively, substantially as described.

11. The combination, with the swivel-rack and the swivel-shuttles, of a cam-shaft provided with two cams and a switching device, substantially such as described, two treadles to be acted upon by said cams to sink the swivel-rack, a lever to be actuated by said switching device and by it given a reciprocating lateral motion to operate the swivel-shuttles, intermediate mechanism connecting said treadles with the swivel-rack and said lever with the swivel-shuttles, a treadle-shaft having pivotal supports for said treadles and lever, which shaft is capable of a rotary motion, and a reciprocating device adapted to be controlled by a pattern mechanism and adapted to give a rotary motion to said treadle-shaft, whereby the said treadles and lever may be raised or lowered for the purpose of placing them in and out of engagement with said cams and switching device, respectively, substantially as described.

12. The combination, with the swivel-rack and the swivel-shuttles, of the cam-shaft S, provided with the cams $e$ and switching-cylinder $d$, means for rotating said shaft, the treadles $b$, links $f^{41}$, rods $F^2$, springs $f^3$, the lever $h^5$, connecting-bar $h^7$, shaft $h^{10}$, rod $h^{12}$, levers $h^8$ $h^{18}$, rack $m^2$, pinions $m'$, the treadle-shaft $S^{21}$, provided with the lever-arms $b^2$ and $b^3$, the double-armed lever Y, adapted to be controlled by a pattern mechanism and adapted to give a rotary motion to said treadle-shaft, and the stops $a^4$, arranged substantially as described.

13. In a loom, the combination of the following elements, viz: the lay, the swivel-rack, a cam-shaft provided with two sets of cams and a switching device, substantially such as described, two treadles or levers to be acted upon by one set of said cams to operate the picking-sticks of the fly-shuttles, and intermediate mechanism connecting said treadles or levers with said picking-sticks, two treadles to be acted upon by the other set of said cams to sink the swivel-rack, intermediate mechanism connecting said treadles with the swivel-rack, a lever to be actuated by said switching device and by it given a reciprocating lateral motion to operate the swivel-shuttles, intermediate mechanism connecting said lever with the swivel-shuttles, a treadle-shaft having pivotal supports for said last-mentioned treadles and lever, which shaft is capable of a rotary motion, and a reciprocating device adapted to be controlled by a pattern mechanism and adapted to give a rotary motion to said treadle-shaft, whereby the said treadles and lever supported thereon may be raised or lowered for the purpose of placing them in and out of engagement with their respective cams and switching device, substantially as described.

14. The combination of the swivel-rack with a partially-rotating disk $p$, adapted to be controlled in its movement by a pattern mechanism and provided with a slotted arm $p^8$, the stud $p^{10}$, provided with the nut $p^{25}$ and flange $p^{11}$ and adapted to move in said slot, the rod $p^2$, one end of which is pivoted to said stud $p^{10}$ and the other to the swivel-rack, the stops $p^{12}$, and the spring $p^{22}$, substantially as described.

JOSEPH WADSWORTH.

Witnesses:
GEO. M. BAKER,
H. SWEENEY.